United States Patent
Marley

[19]

[11] Patent Number: 5,823,586
[45] Date of Patent: Oct. 20, 1998

[54] TRUCK WHEEL CONTAINMENT FRAME

[76] Inventor: George W. Marley, 82 Tayok Dr., Woodbridge, Ontario, Canada, L4L 2N2

[21] Appl. No.: 905,346

[22] Filed: Aug. 4, 1997

[51] Int. Cl.$^6$ .................................................. B62B 9/14
[52] U.S. Cl. ........................................... 293/126; 280/851
[58] Field of Search ............................... 296/198; 293/15, 293/17, 117, 126, 128; 280/770, 847, 848, 849, 851, 160

[56] References Cited

U.S. PATENT DOCUMENTS

| | | |
|---|---|---|
| 357,800 | 2/1887 | Wescott . |
| 495,801 | 4/1893 | Henthorne . |
| 526,532 | 9/1894 | Jennings . |
| 617,101 | 1/1899 | Kelly . |
| 826,432 | 7/1906 | Jousset .................................... 293/128 |
| 942,290 | 12/1909 | Shank . |
| 1,011,677 | 12/1911 | Turner . |
| 1,485,326 | 2/1924 | Adams . |
| 1,511,085 | 10/1924 | McIntyre . |
| 1,553,656 | 9/1925 | Williams . |
| 1,588,736 | 6/1926 | Hornquist . |
| 1,605,584 | 11/1926 | Hoberecht .............................. 293/126 |
| 1,612,944 | 1/1927 | Richardson . |
| 1,619,451 | 3/1927 | Weymouth ......................... 293/126 X |
| 2,605,119 | 7/1952 | Earnest . |
| 3,110,515 | 11/1963 | Loftin ...................................... 296/198 |
| 3,860,262 | 1/1975 | Goings .................................... 280/851 |
| 3,866,943 | 2/1975 | Innis ........................................ 280/851 |
| 4,060,268 | 11/1977 | Page, Jr. . |
| 4,124,221 | 11/1978 | Goings .................................... 280/851 |
| 4,445,700 | 5/1984 | Schroeder .............................. 280/851 |
| 5,462,324 | 10/1995 | Bowen et al. . |

FOREIGN PATENT DOCUMENTS

| | | | |
|---|---|---|---|
| 681661 | 5/1930 | France ................................... 280/160 |
| 4715 | 7/1913 | United Kingdom .................. 280/160 |

*Primary Examiner*—Joseph D. Pape
*Attorney, Agent, or Firm*—Swabey Ogilvy Renault

[57] ABSTRACT

The invention provides a truck wheel containment frame, for enclosing and containing disengaged wheels of a vehicle within an interior of the frame. The frame includes support posts extending from the truck body and disposed laterally outward of the wheels. Containment bars or sheet metal span between each adjacent post for containing a disengaged wheel within the interior of the frame bounded the containment bars, the vehicular body and a roadway surface. The containment bars are disposed above the roadway a distance less than the thickness of a disengaged wheel. Releasable fasteners releasably connect the containment bars to the support posts. Preferably the truck wheel containment frame includes sensors for sensing the presence of a disengaged truck wheel within the interior of the frame. The invention may be applied to any type of truck such as a truck trailer combination multi-trailer assemblies, cement trucks, dump truck, liquid transport trailers and others.

11 Claims, 4 Drawing Sheets

TRUCK WHEEL CONTAINMENT FRAME

TECHNICAL FIELD

The invention is directed to a truck wheel containment frame for preventing accidents caused by truck wheels that become accidentally disengaged.

BACKGROUND OF THE ART

Due to poor maintenance, high volume truck and vehicular traffic, in recent years accidents caused by disengaged truck wheels have become increasingly common. In such accidents, the entire truck wheel or large parts of the wheel rim and tire disengage from the truck. Deaths and severe personal injuries are unfortunately not uncommon, and in many cases public outcry has prompted stricter enforcement of truck safety rules and inspections.

Since the truck wheel may be moving at very high speeds when disengaged, the disengaged wheel may poses significant risks to people in other vehicles on the roadway, as well as people in adjacent areas. A fast moving truck wheel weighs 300 to 400 pounds and may bounce or roll significant distances before hitting an obstacle or coming to rest.

The main cause of wheel disengagement is improper maintenance wherein various wheel parts become fractured or corroded. This type of damage can generally be detected by regular inspections and repair. However, if trucking equipment is not rolling it is not earning revenue, and the urge to meet deadlines and bottom lines reduces recognition that routine maintenance is essential.

Many truck wheels are constructed as a composite of steel rim, central hub and removable clamps connecting the rim and hub. The clamps are often cast metal which is more prone to crack in sudden failure than welded steel for example. Metal fatigue may cause cracking of the clamps, lug nuts or other wheel retaining parts. As a result, disengagement between the wheel hub and tire-rim combination occurs.

The truck driver is often totally unaware that a wheel has disengaged. The driver on hearing a sudden noise or sensing some difficulty in controlling the truck will react. However, if an outside rear trailer wheel disengages, the wheel spins away without causing noise or otherwise notifying the driver. Rear wheels are generally disposed in tandem with four wheels per rear axle, and therefore when an outside wheel becomes disengaged, the truck and trailer remain fully supported on the remaining tandem wheels.

Protective guards have been proposed in the prior art, however such guards are provided to prevent people, farm animals or other vehicles, motorcycles etc. from falling between the wheels and roadway.

Examples of such prior art guards as described in the following U.S. Pat. Nos.: 4,060,268 to Page, Jr.; 2,605,119 to Earnest; 357,800 to Wescott; 495,801 to Henthorne; 526,532 to Jennings; 942,290 to Shank; 1,485,326 to Adams; 1,553,655 to Williams; 1,588,736 to Homquist; 617,101 to Kelly; 1,511,085 to McIntyre; 1,612,944 to Richardson; 1,011,677 to Turner and 5,462,324 to Bowen et al.

Such prior art guards are not specifically designed to contain disengaged wheels, but to prevent people and animals from getting under the wheels. As such there is a need to keep the guard close to the roadway surface. Due to the bouncing of the vehicle on suspension and snow buildup, such guards are often impractical. Continued contact with road surfaces damages or wears the guards.

DISCLOSURE OF THE INVENTION

The invention provides a novel truck wheel containment frame, for enclosing and containing disengaged wheels of a vehicle within an interior of the frame, the frame comprising: a plurality of support posts extending from a vehicular body and disposed laterally outward of the wheels; containment means spanning between each adjacent post for containing a disengaged wheel within the interior of the frame bounded the containment means, the vehicular body and a roadway surface, the containment means being disposed above the roadway a distance less than the thickness of said disengaged wheel; and releaseable fastening means for releaseably connecting the containment means to the support posts. Preferably the truck wheel containment frame includes sensor means for sensing the presence of a disengaged truck wheel within the interior of the frame.

The containment frame is easily opened for inspection and repair, though it is robust enough to contain a disengaged wheel thus preventing accidents. Quick release connecting means balance the need for protection with the need to quickly access the wheels for inspection and maintenance.

The frame is lightweight and open to allow visual inspection, and can be easily retrofit to existing trucks and trailers. Since the frame is intended to contain rather large wheels, the clearance between the roadway and frame is sufficient to prevent engagement with the roadway under normal driving conditions. The frame can include large openings, which are smaller than the truck wheel, to make the frame lightweight and simple to build.

The provision of sensors within the interior of the frame enables the driver to be immediately notified of a wheel disengagement problem.

Further details of the invention and its advantages will be apparent from the detailed description and drawings included below.

BRIEF DESCRIPTION OF THE DRAWINGS

In order that the invention may be readily understood, two preferred embodiments of the invention and variations thereof will be described by way of example, with reference to the accompanying drawings wherein.

DETAILED DESCRIPTION OF PREFERRED EMBODIMENTS

Figure 1:
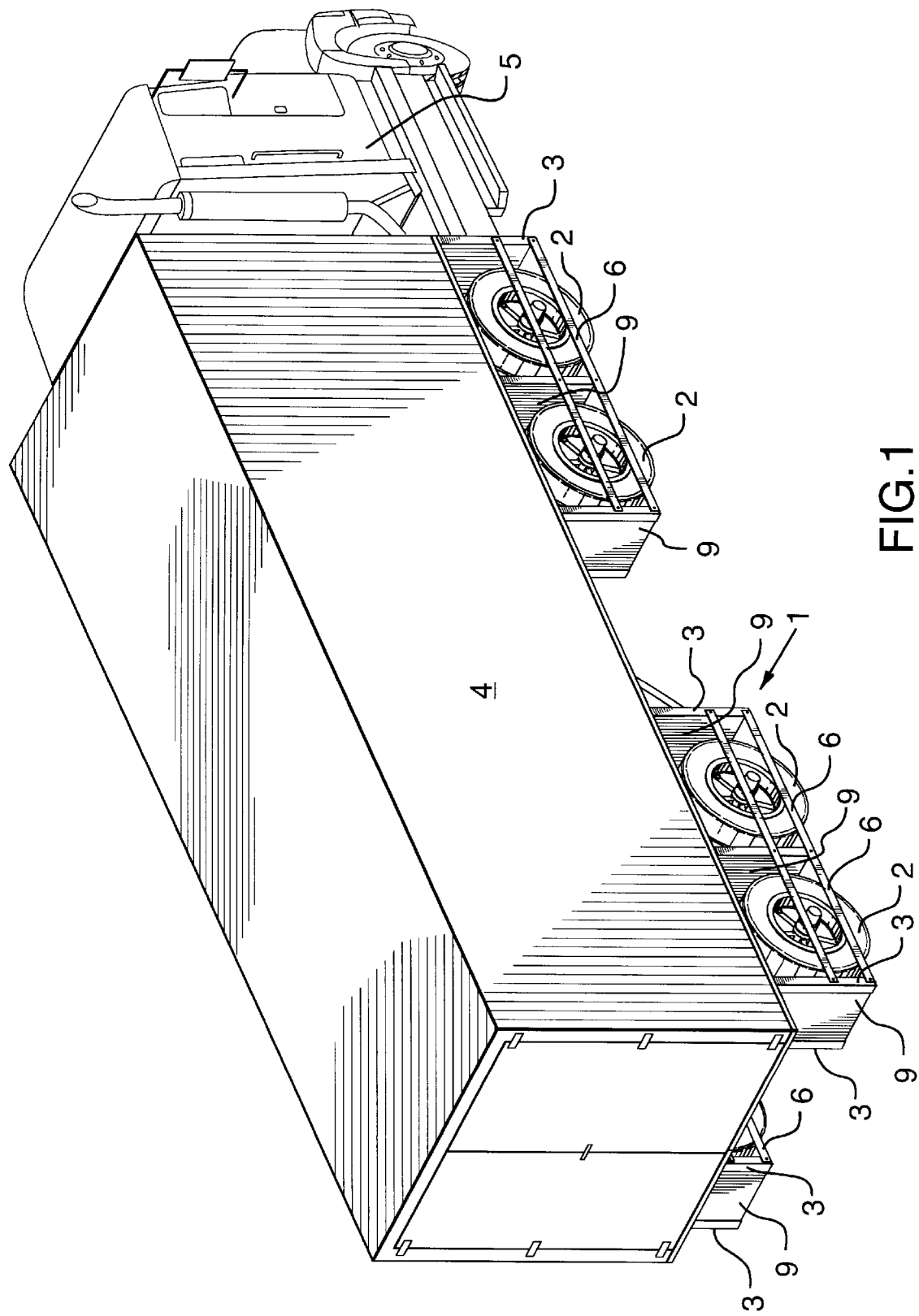
FIG. 1 is a rear perspective view of a truck tractor and trailer assembly with a truck wheel containment frame extending from the trailer frame around the rear tandem axles of the trailer, and a second forward frame mounted to the frame of the tractor extending around the tractor rear tandem axles to allow for turning on the pin or "fifth wheel" connecting the tractor and trailer.
Figure 2:
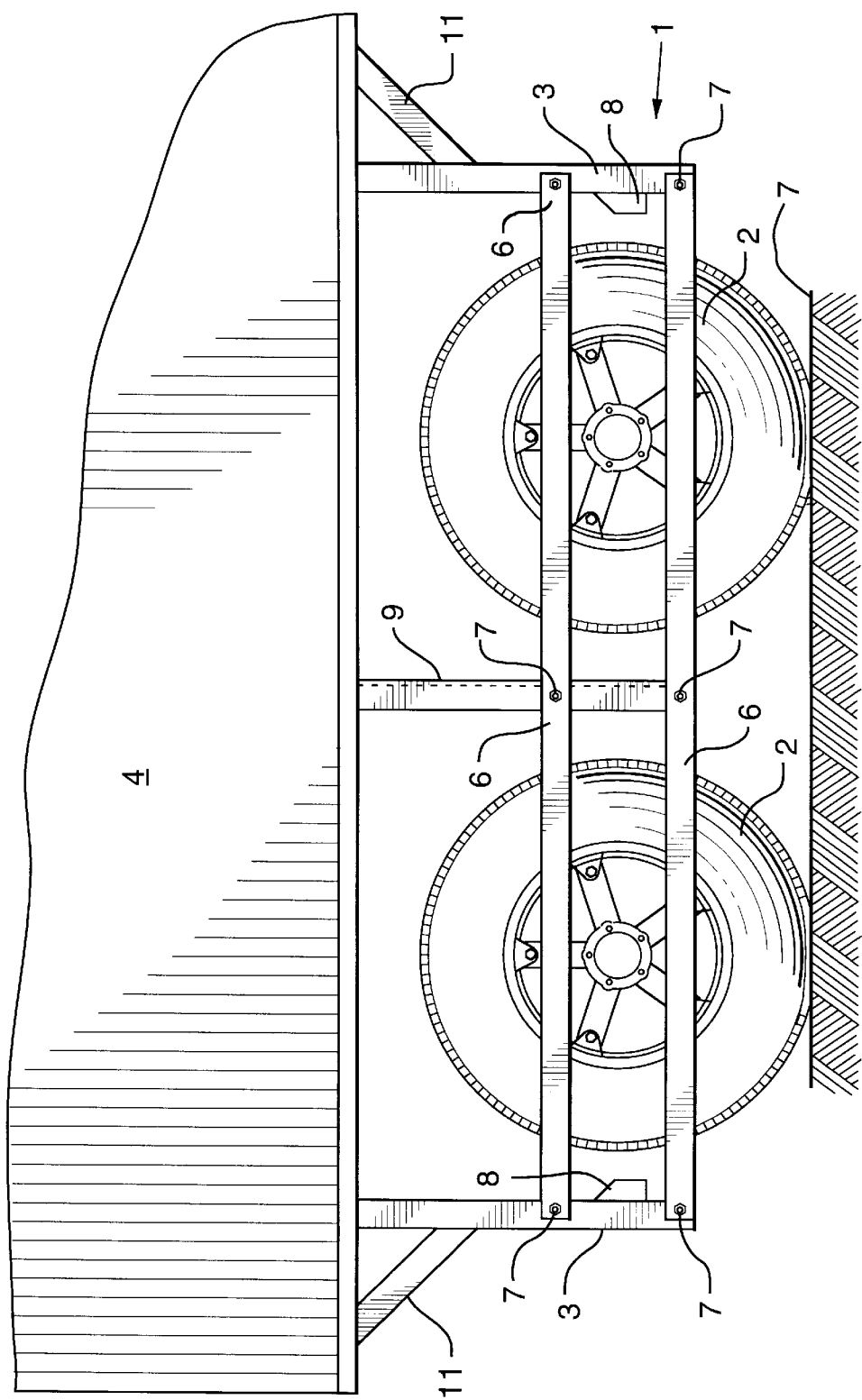
FIG. 2 is a side elevation detail view of the rear containment frame showing in particular the post and strap construction with supporting braces and sensors on the posts.
Figure 3:
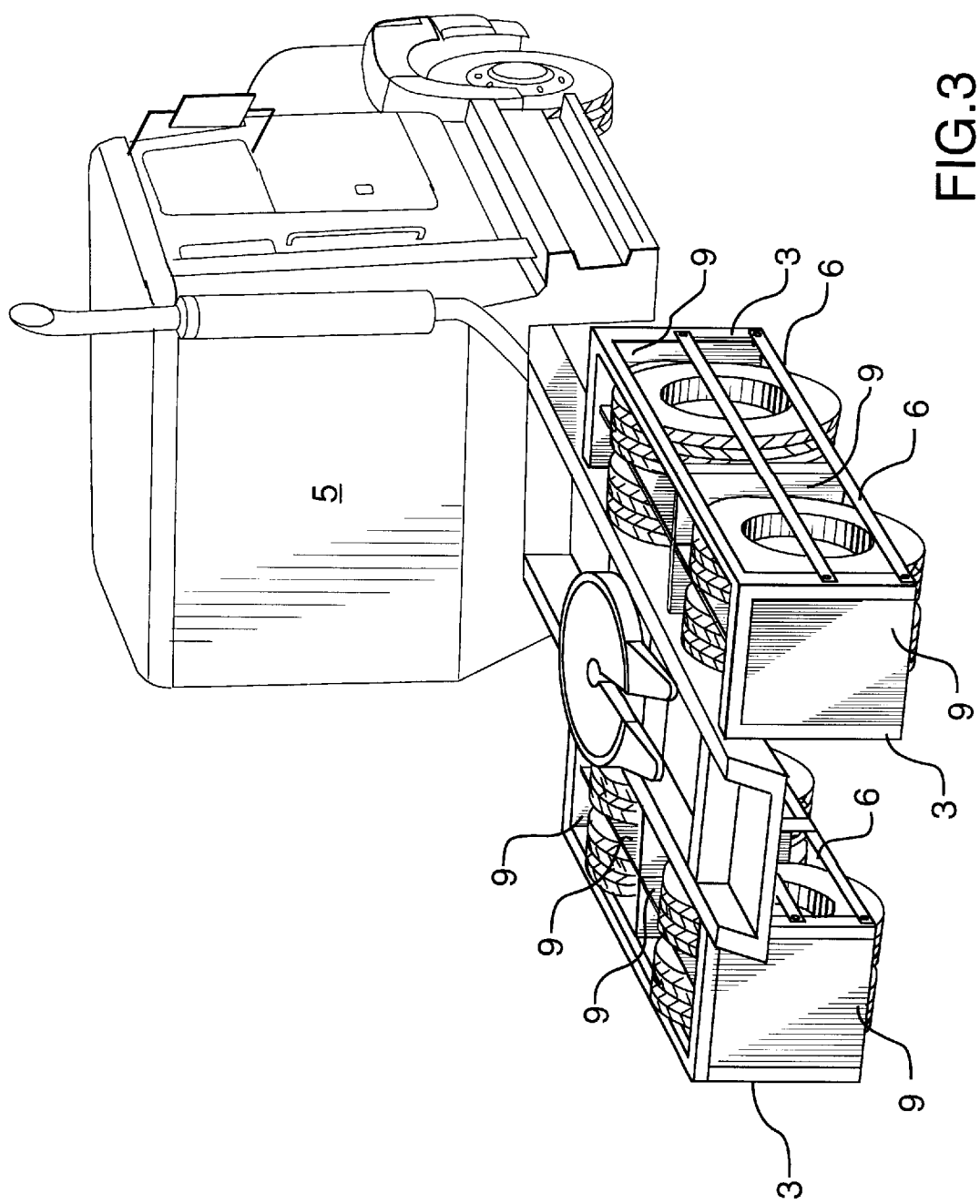
FIG. 3 is a rear perspective view of a truck tractor with trailor removed, showing wheel containment frames around each pair of tandem wheels, and with containment bars extending between adjacent tandem wheels.

With reference to FIG. 1, the drawing shows two embodiments of the invention. The first embodiment comprises a truck wheel containment frame mounted extending from the trailer frame around the rear tandem axles of the trailer.

The second forward frame is mounted to the frame of the tractor extending around the tractor rear tandem axles to allow for turning on the fifth wheel connecting the tractor and trailer. Both frames are identical in construction with the exception that the front frame is mounted with beams or brackets extending laterally from the tractor frame, whereas the rear frame can be mounted directly to the underside of the trailer body frame.

As shown in FIG. 1, the truck wheel containment frame I encloses the tandem wheels 2 around all four lateral sides. The frame 1 is constructed of rigid metal members to ensure that disengaged wheels 2 of the vehicle are contained within the interior of the frame 1.

The frame 1 is constructed of a plurality of support posts 3 extending from a vehicular body, such as the trailer frame 4 or the tractor frame 5, and disposed laterally outward of the wheels 2. The posts 3 can be permanently welded to the body 4, 5 or may be connected with bolts or other removable connectors for maintenance and repair. For added frame strength, diagonal brackets 11 can be provided.

Containment means 6 can include various elongate metal sections to span between each adjacent post 3 for containing a disengaged wheel within the interior of the frame 1. The disengaged wheel is therefore bounded by the containment means 3, the vehicular body 4,5 and the roadway surface 7. In all cases the containment means 6 and posts 3 are disposed above the roadway 7 a distance less than the thickness of any disengaged wheel 2.

Figure 4:
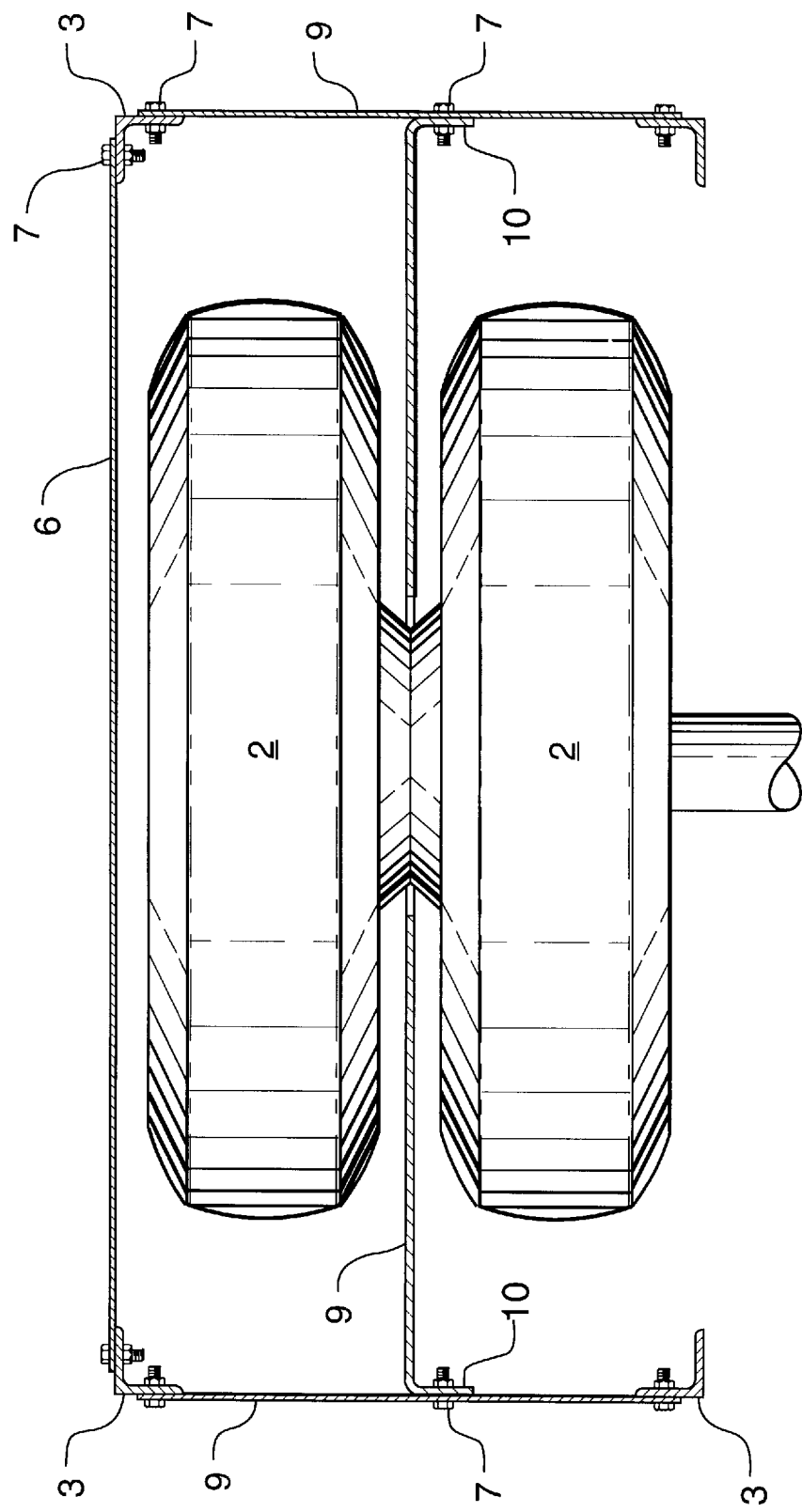
FIG. 4 is a top detail view of one containment frame disposed around a pair of tandem wheels.

The containment means 6 are preferably made of elongate metal sections such as sheet metal, open web grating, angle irons, channels, wire mesh or plate. The best material for such use contemplated by the inventor is flat metal straps 6 as illustrated in the drawings. Flat metal straps 6 are easily replaced if damaged or corroded, are readily available and of low cost.

Where space is limited, between wheels for example, flat sheet metal plates 9 may be used advantageously. As shown in FIG. 4, for example, plates 9 have bent flanges 10 to enable connection to adjacent plates 9, posts 3 and straps 6 of the framework with fasteners 7.

Releaseable fastening means 7 releaseably connecting the containment means 6 to the support posts 3. Suitable releaseable fasteners 7 can be selected from: threaded bolts and wing nuts; toggle clamps; slotted openings; and twist locks. Again for simple construction, the inventor proposes threaded bolts and wing nuts in the drawings.

Where the vehicle includes a plurality of wheels 2 disposed in tandem, as in the example in the accompanying drawings and FIG. 4 in particular, containment means 6 preferrably extend between adjacent tandem wheels 2 for preventing mutual contact therebetween. The wheels 2 are therefore completely surrounded with removable bars 6 containing a disengaged wheel 2 from spinning off and from interferring with the adjacent tandem wheel 2.

For quick sensing of a disengaged wheel sensor means 8 are provided for sensing the presence of a disengaged truck wheel 2 within the interior of the frame I. Suitable sensors can be selected from: electronic motion sensors; limit switches; vibration sensors; optical sensors; strain gauges; and heat sensors. Such electronic, hydraulic or pneumatic sensors can be powered by existing batteries, pneumatic or hydraulic brake systems of the trailer and tractor 5. Alarms positioned in the driver's cab in the tractor 5 communicate with the sensors 8 via cables, conduits or air lines for example.

In summary, the invention provides a simple easily built framework 1 to prevent the escape of disengaged truck wheels 2 reducing the risk of serious accident. The frame 1 is adaptable to any size or shape of truck trailer 4 or tractor 5, and can be retrofit with commonly available workshop tools and labour. The quick release of connectors 7 ensures that maintenance will not be hampered and drivers will not consider the structure to be an unbearable nuisance.

Although the frame structure is shown as a retrofit embodiment, it is most desirable to construct newly built truck trailers 4 and tractors 5 with factory installed frames 1. The invention may be applied to any type of truck such as the truck trailer combination in the accompanying illustrations, multi-trailer assemblies, cement trucks, dump truck, liquid transport trailers and others.

The provision of sensors 8 ensure that the truck driver is notified immediately of wheel disengagement, and can take quick action to prevent injury.

Although the above description and accompanying drawings relate to specific preferred embodiments as presently contemplated by the inventor, it will be understood that the invention in its broad aspect includes mechanical and functional equivalents of the elements described and illustrated.

The embodiments of the invention in which an exclusive property or privilege is claimed are defined as follows:

1. A truck wheel containment frame, for enclosing and containing a disengaged wheel of a vehicle within an interior of the frame, wherein the vehicle includes a plurality of wheels disposed in tandem, the frame comprising:

a plurality of support posts extending from a vehicular body and disposed laterally outward of the wheel;

containment means spanning between each adjacent post for containing a disengaged wheel within the interior of the frame bounded by the containment means, the vehicular body and a roadway surface, the containment means being disposed above the roadway a distance less than the thickness of said disengaged wheel; and wherein containment means extend between adjacent tandem wheels for preventing mutual contact therebetween, and releasable fastening means for releasably connecting the containment means to the support posts.

2. A truck wheel containment frame in accordance with claim 1 further comprising sensor means for sensing the presence of a disengaged truck wheel within the interior of the frame.

3. A truck wheel containment frame in accordance with claim 2 wherein the sensing means consist of sensors selected from the group comprising: electronic motion sensors; limit switches; vibration sensors; optical sensors; strain gauges; and heat sensors.

4. A truck wheel containment frame in accordance with claim 1 wherein the releaseable fastening means consist of fasteners selected from the group comprising: threaded bolts and wing nuts; toggle clamps; slotted openings; and twist locks.

5. A truck wheel containment frame in accordance with claim 1 wherein the containment means comprises elongate metal sections.

6. A truck wheel containment frame in accordance with claim 5 wherein the elongate metal section comprises sheet metal.

7. A truck wheel containment frame in accordance with claim 5 wherein the elongate metal section comprises open web metal grating.

8. A truck wheel containment frame in accordance with claim 5 wherein the elongate metal section comprises flat metal straps.

9. A truck wheel containment frame in accordance with claim 1 wherein the posts are connected to the vehicular body with removable connectors.

10. A truck wheel containment frame in accordance with claim 1 wherein the vehicular body comprises a truck trailer.

11. A truck wheel containment frame in accordance with claim 1 wherein the vehicular body comprises a truck tractor.

* * * * *